US008862267B2

(12) United States Patent
Aoba et al.

(10) Patent No.: US 8,862,267 B2
(45) Date of Patent: Oct. 14, 2014

(54) GRIPPING APPARATUS AND GRIPPING APPARATUS CONTROL METHOD

(75) Inventors: Masato Aoba, Tokyo (JP); Masakazu Matsugu, Yokohama (JP); Masafumi Takimoto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1022 days.

(21) Appl. No.: 12/682,242

(22) PCT Filed: Sep. 26, 2008

(86) PCT No.: PCT/JP2008/067978
§ 371 (c)(1),
(2), (4) Date: Apr. 8, 2010

(87) PCT Pub. No.: WO2009/057416
PCT Pub. Date: May 7, 2009

(65) Prior Publication Data
US 2010/0256818 A1    Oct. 7, 2010

(30) Foreign Application Priority Data
Oct. 29, 2007    (JP) ................................. 2007-280439

(51) Int. Cl.
*G06F 19/00* (2011.01)
*B25J 9/16* (2006.01)

(52) U.S. Cl.
CPC ..... *B25J 9/1612* (2013.01); *G05B 2219/39391* (2013.01); *G05B 2219/40032* (2013.01); *G05B 2219/39568* (2013.01); *G05B 2219/40087* (2013.01); *B25J 9/1697* (2013.01)
USPC ......................................................... 700/245

(58) Field of Classification Search
USPC ......................................................... 700/245
See application file for complete search history.

(56) References Cited

U.S. PATENT DOCUMENTS

| 4,146,924 | A  | * | 3/1979 | Birk et al. ...................... 700/259 |
| 4,694,230 | A  | * | 9/1987 | Slocum et al. ............. 318/568.17 |
| 7,200,260 | B1 | * | 4/2007 | Watanabe et al. ............. 382/153 |
| 7,474,939 | B2 | * | 1/2009 | Oda et al. ....................... 700/245 |
| 7,657,346 | B2 | * | 2/2010 | Ban et al. ....................... 700/262 |

(Continued)

FOREIGN PATENT DOCUMENTS

| EP | 1488893 A | 12/2004 |
| FR | 2644379 A | 9/1990 |

(Continued)

OTHER PUBLICATIONS

Schraft, R.D. et al., "Intelligent Picking of Chaotically Stored Objects," vol. 23, No. 1, 2003, pp. 38-42.

(Continued)

*Primary Examiner* — Khoi Tran
*Assistant Examiner* — Harry Oh
(74) *Attorney, Agent, or Firm* — Carter, DeLuca, Farrell & Schmidt, LLP

(57) ABSTRACT

A gripping apparatus comprises an information acquisition unit (A 311, A315, A301) configured to acquire information about a position and orientation of an object (23) to be gripped by a gripper (12), a movement path generating unit (A610) configured to acquire a target state suitable for gripping the object, based on the acquired information, and generate a movement path of the gripper toward the target state, and a controller configured to move the gripper along the generated movement path and cause the gripper to grip the object.

13 Claims, 22 Drawing Sheets

(56) References Cited

U.S. PATENT DOCUMENTS

| | | | |
|---|---|---|---|
| 7,920,124 B2* | 4/2011 | Tokita et al. | 345/156 |
| 8,155,789 B2* | 4/2012 | Nagatsuka et al. | 700/250 |
| 2002/0107611 A1* | 8/2002 | Son | 700/245 |
| 2004/0037689 A1* | 2/2004 | Watanabe et al. | 414/730 |
| 2004/0172164 A1* | 9/2004 | Habibi et al. | 700/245 |
| 2004/0266276 A1* | 12/2004 | Hariki et al. | 439/894 |
| 2006/0104788 A1* | 5/2006 | Ban et al. | 414/729 |
| 2008/0059131 A1* | 3/2008 | Tokita et al. | 703/5 |
| 2008/0201015 A1* | 8/2008 | Brogardh | 700/254 |
| 2008/0253612 A1* | 10/2008 | Reyier et al. | 382/103 |

FOREIGN PATENT DOCUMENTS

| | | |
|---|---|---|
| JP | 03-270890 A | 12/1991 |
| JP | 04-331081 A | 11/1992 |
| JP | 06-188061 A | 7/1994 |
| JP | 08-048271 A | 2/1996 |
| JP | 2005-011580 A | 1/2005 |
| JP | 2005-169564 * | 6/2005 |
| JP | 2006-048372 A | 2/2006 |
| JP | 2006-212743 A | 8/2006 |
| JP | 2007-245283 A | 9/2007 |
| WO | 2007/046763 A | 4/2007 |

OTHER PUBLICATIONS

Japanese Office Action for Counterpart Japanese Application No. 2007-280439, dated Jan. 8, 2013.

Japanese Office Action for Application No. 2007-280439 dated Apr. 24, 2012.

* cited by examiner

END PORTION INSERTED STATE

JOINING END STATE

JOINING WAITING STATE

JOINED STATE

PRE-JOINED STATE

TIP PORTION INSERTED STATE

GRIPPING APPARATUS AND GRIPPING APPARATUS CONTROL METHOD

CROSS REFERENCE TO RELATED APPLICATIONS

This application is a National Stage filing of PCT application No. PCT/JP2008/067978 filed on Sep. 26, 2008 which claims priority from Japanese Patent Application No. 2007-280439 filed on Oct. 29, 2007, all of which is hereby incorporated by reference herein in their entirety.

TECHNICAL FIELD

The present invention relates to a gripping apparatus for gripping an object to be gripped and a method for controlling the gripping apparatus.

BACKGROUND ART

Industrial products are manufactured via various steps, and various working robots are used to automate a task of each step. However, as the task is more complicated, it is more difficult to automate each step using a working robot.

Japanese Patent Laid-Open No. 2005-11580 proposes a gripping apparatus for performing a task such that a flexible cable requiring a relatively complicated task step is gripped and the gripped flexible cable is connected to a connector.

This gripping apparatus performs the following task. Initially, an intermediate portion of a flexible cable that does not move significantly is loosely gripped by a first robot hand. The first hand is moved along the flexible cable so as to fix a tip portion of the cable to a predetermined position. The cable tip portion, after fixed to the predetermined position, is gripped by a second robot hand.

Thus, the conventional gripping apparatus, when gripping a cable, requires two steps using two robot hands, resulting in a complicated gripping task.

DISCLOSURE OF INVENTION

According to the present invention, a gripping apparatus is smoothly controlled.

According to one aspect of the invention, there is provided a gripping apparatus comprising: an information acquisition unit configured to acquire information about a position and orientation of an object to be gripped by a gripper; a movement path generating unit configured to acquire a target state suitable for gripping the object t, based on the acquired information, and generate a movement path of the gripper toward the target state; and a controller configured to move the gripper along the generated movement path and cause the gripper to grip the object.

According to another aspect of the invention, there is provided a method for controlling a gripping apparatus, comprising: causing an information acquisition unit to acquire information about a position and orientation of an object to be gripped by a gripper; causing a movement path generating unit to acquire a target state suitable for gripping the object, based on the acquired information, and generate a movement path of the gripper toward the target state; and causing a controller to move the gripper along the generated movement path and causing the gripper to grip the object.

According to still another aspect of the invention, there is provided a computer-readable storage medium storing a computer program for causing a computer to function as: an information acquisition unit configured to acquire information about a position and orientation of an object to be gripped by a gripper; a movement path generating unit configured to acquire a target state suitable for gripping the object, based on the acquired information, and generate a movement path of the gripper toward the gripping target state; and a controller configured to move the gripper along the generated movement path and cause the gripper to grip the object.

Further features of the present invention will become apparent from the following description of exemplary embodiments (with reference to the attached drawings).

BEST MODE FOR CARRYING OUT THE INVENTION

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

(First Embodiment)

Figure 1:
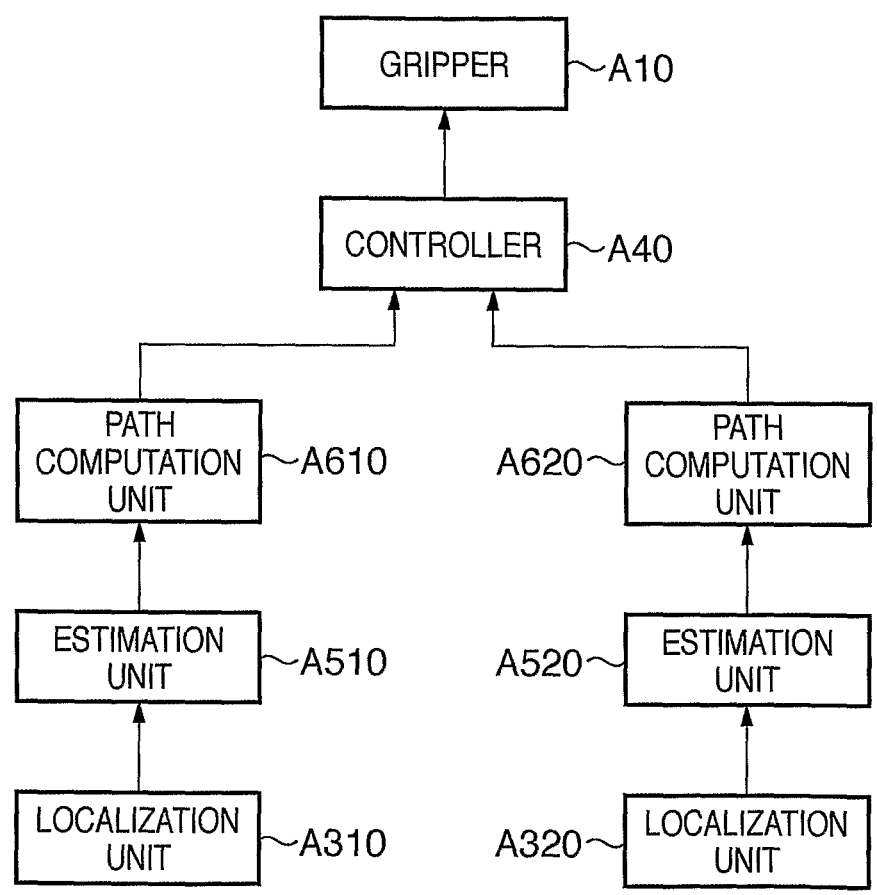
FIG. 1 is a diagram showing a functional configuration of a gripping apparatus according to a first embodiment of the present invention.

FIG. 1 is a diagram showing a functional configuration of a gripping apparatus according to this embodiment.

A10 indicates a gripper that performs a task, such as gripping or the like, with respect to an object to be gripped. The gripper A10 comprises a robot arm and a robot hand for performing gripping or the like, and the like.

A40 indicates a controller that controls an operation of the gripper A10. The controller A40 comprises a personal computer for calculating an amount of operation of the gripper A10, and the like.

A310 indicates a localization unit that acquires three-dimensional positions of the gripper A10 and the object to be gripped when the gripper A10 grips the object to be gripped. The localization unit A310 comprises an image capturing unit, such as a camera or the like.

A320 also indicates a localization unit that acquires positions of the gripper A10 and the object to be gripped when the gripper A10 joins the object to be gripped to an interface unit. The localization unit A320 also comprises an image capturing unit, such as a camera or the like.

A510 indicates an estimation unit that functions as a portion of an information acquisition unit and estimates three-dimensional information, such as positions, orientations or the like of the gripper A10 and the object to be gripped, based on three-dimensional position information acquired by the localization unit A310. The estimation unit A510 comprises a personal computer for performing computation for the estimation process, and the like.

A520 also indicates an estimation unit that functions as a portion of an information acquisition unit and estimates three-dimensional information, such as positions, orientations or the like of the gripper A10 and the object to be gripped, based on three-dimensional position information acquired by the localization unit A320. The estimation unit A520 also comprises a personal computer for performing computation for an estimation process, and the like.

A610 indicates a path computation unit that generates a movement path (first information) along which a gripping operation of the gripper A10 is performed, based on the three-dimensional information acquired by the estimation unit A510. The path computation unit A610 comprises a personal computer that performs computation for path generation, and the like.

A620 indicates a path computation unit that generates a movement path (second information) along which a joining task of the gripper A10 is performed, based on the three-dimensional information acquired by the estimation unit A520. The path computation unit A620 comprises a personal computer that performs computation for path generation, and the like.

The controller A40 controls a movement of the gripper A10 based on the movement paths acquired by the path computation unit A610 and the path computation unit A620 so as to perform gripping and joining tasks with respect to the object to be gripped.

Figure 2:
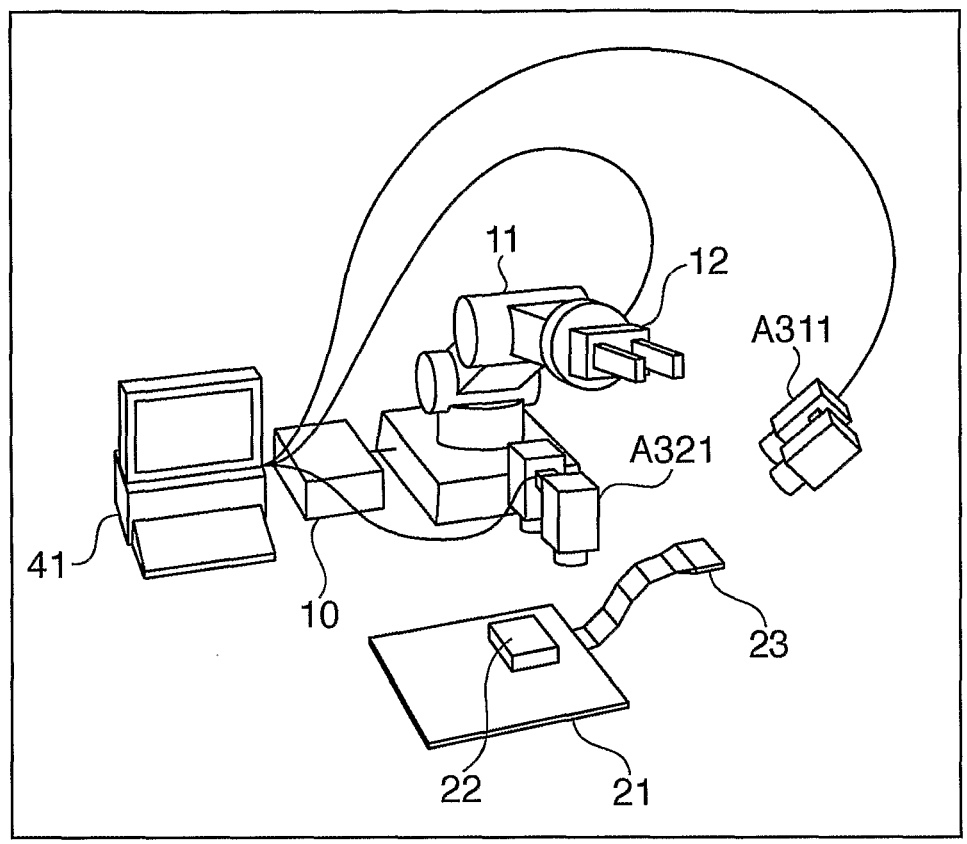
FIG. 2 is a diagram showing a specific configuration of the gripping apparatus of the first embodiment.

FIG. 2 is a diagram showing a specific configuration corresponding to the functional configuration of FIG. 1.

10 indicates a robot controller that corresponds to the controller A40 of FIG. 1 and transmits an instruction to the gripping apparatus.

11 indicates a robot arm that is included in the gripper A10 and grips the object to be gripped. 12 indicates a gripper-type robot hand that is included in the gripper A10 and is attached thereto as an end effector of the robot arm 11.

21 indicates a printing board that is an exemplary object to be operated (physical object) that is to be gripped by the gripper A10.

22 indicates an interface unit that is an exemplary object to be operated by the gripper A10, such as a connecter.

23 indicates an object to be gripped that is an exemplary object to be operated by the gripper A10, such as a flexible cable. The printed board 21, the interface unit 22, and the object 23 are also collectively referred to as a workpiece.

41 indicates a calculator that comprises a personal computer including a CPU, a RAM and the like, and the like. The calculator 41 corresponds to the estimation unit A510, the estimation unit A520, the path computation unit A610, and the path computation unit A620 of FIG. 1. A computer program for operating the estimation unit A510, the estimation unit A520, the path computation unit A610, and the path computation unit A620 is stored in a RAM of the calculator 41. A result of computation by the calculator 41 is transmitted to the robot controller 10, which controls the robot arm 11 and the robot hand 12.

A311 indicates a stereo camera that corresponds to the localization unit A310 of FIG. 1 and functions as a portion of the information acquisition unit.

A321 indicates a stereo camera that corresponds to the second localization unit A320 of FIG. 1 and functions as a portion of the information acquisition unit. The stereo camera A311 and the stereo camera A321 are arranged at positions that allow them to capture images of a workpiece even when, for example, the object 23 is deformed.

Figure 3:
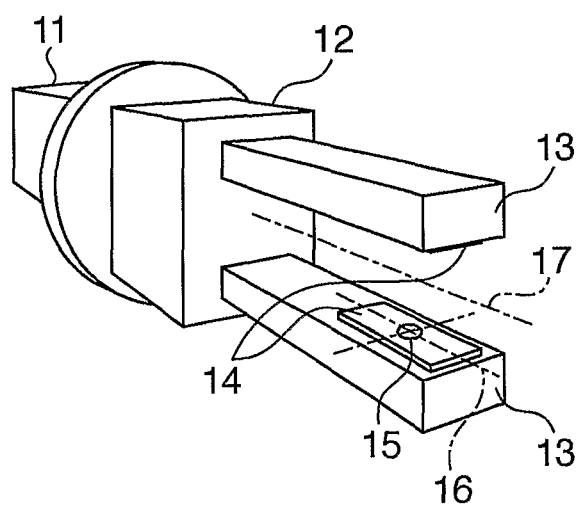
FIG. 3 is a diagram showing a detailed structure of a tip portion of a robot hand 12.

FIG. 3 is a diagram showing a detailed structure of a tip portion of the robot hand 12 of FIG. 2.

13 indicates fingers that contact the object 23 when the robot hand 12 grips the object 23, and have a length enough to grip the object 23.

14 indicates gripping surfaces of the fingers 13 that contact the object 23 when the robot hand 12 grips the object 23.

15 indicates a gripping center position when the object 23 is gripped.

16 indicates a finger center reference line that indicates a center of the finger 13.

17 indicates a center axis of the robot hand 12 that is interposed between the fingers 13.

Note that since various errors are likely to be accumulated during a gripping task, the robot hand 12 is desirably equipped with a mechanism for copying a small amount in a task described below.

Figure 4:
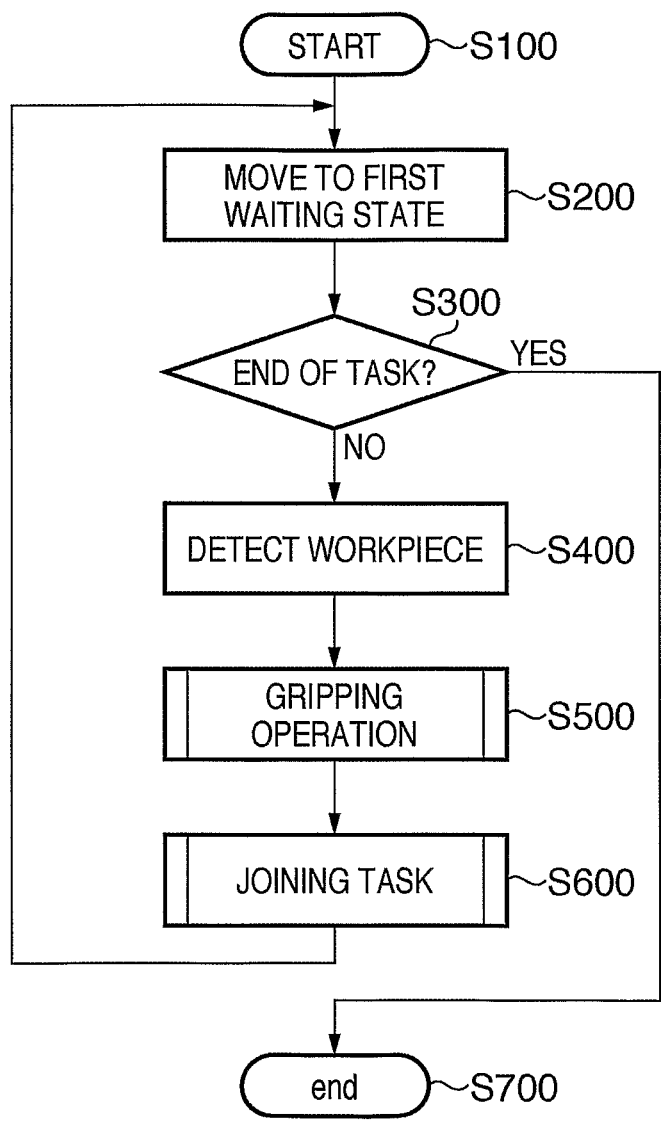
FIG. 4 is a flowchart showing a gripping task process by the gripping apparatus of the first embodiment.

FIG. 4 is a flowchart showing a gripping task process by the gripping apparatus of FIG. 2. Note that each process of FIG. 4 is performed by the robot controller 10, which receives a result of calculation by the calculator 41, controlling operations of the robot arm 11 and the robot hand 12.

Initially, in S100, a task of the gripping apparatus of this embodiment is started.

Figure 7:
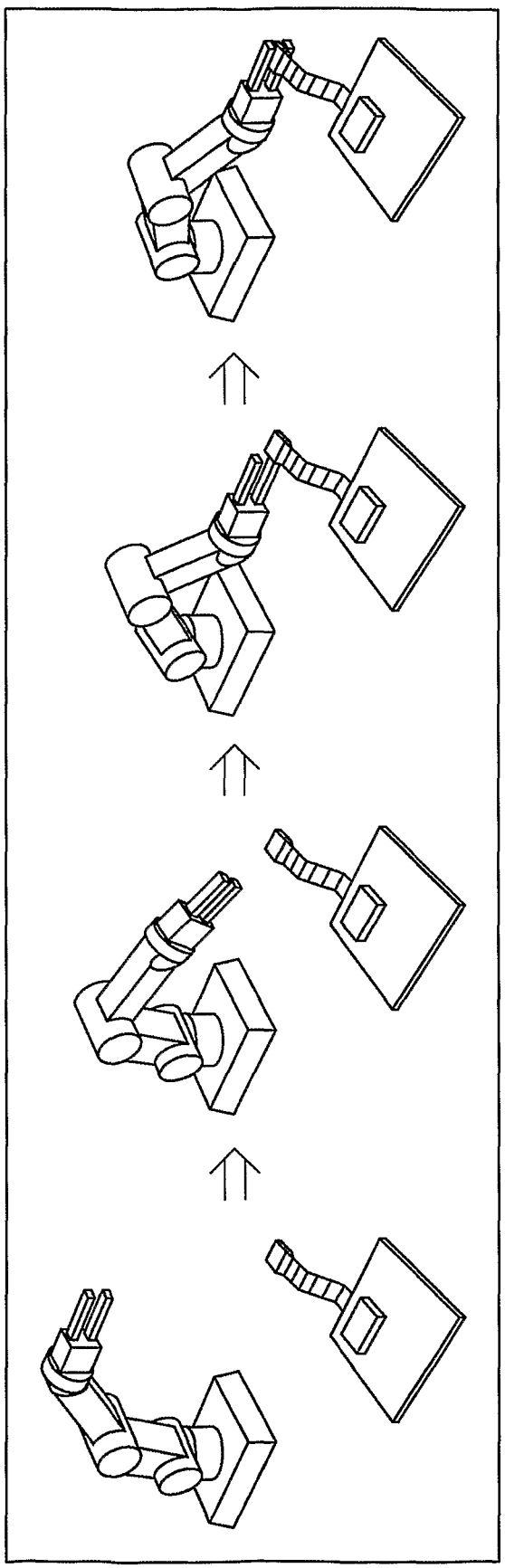
FIG. 7 is a diagram showing a state of a gripper during a gripping task in the first embodiment.

In S200, the robot controller 10 causes the robot arm 11 and the robot hand 12 to go to a first waiting state (initial operation). The left-end portion of FIG. 7 shows the first waiting state of the robot arm 11 and the robot hand 12 of this embodiment. The first waiting state refers to a state in which the robot arm 11 and the robot hand 12 are positioned at a task starting position. In the first waiting state, the robot arm 11 and the robot hand 12 do not interfere with measurement of the object 23 by the stereo camera A311.

In S300, the robot controller 10 determines whether or not the task of the gripping apparatus of this embodiment has been finished. When it is determined that the task has been finished, the process goes to S700 and the task of the gripping apparatus is finished. If it is determined that the task has not been finished, the process goes to S400. Note that the determination of whether or not the gripping task has been finished may be performed by the user's instruction.

In S400, an image of the workpiece (the printed board 21, the interface unit 22, and the object 23) is captured by the stereo camera A311.

Figure 8:
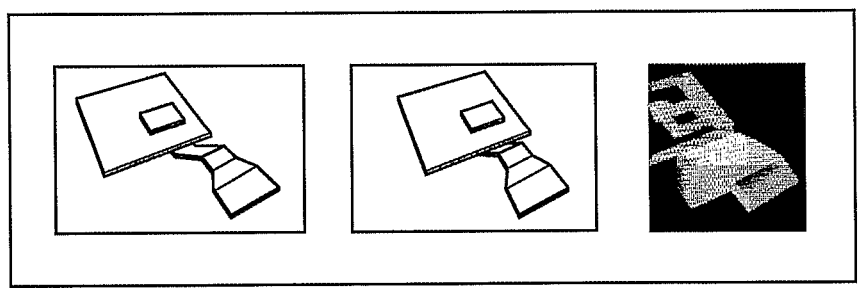
FIG. 8 is a diagram showing camera images captured by a stereo camera.

FIG. 8 shows camera images captured by the stereo camera A311. The left-end portion shows an image captured by a left camera of the stereo camera A311. The middle portion shows a camera image captured by a right camera of the stereo camera A321. In S400, based on the left camera image or the right camera image, it is detected whether or not the workpiece is arranged at a position that allows the gripping apparatus to perform a task. When an image of the workpiece is captured in the left camera image or the right camera image, it is determined that the workpiece is located at a position that allows a task, and the process goes to S500.

In S500, a gripping operation is performed by the gripping apparatus of this embodiment. Here, the object 23 is gripped by the robot arm 11. After the gripping operation in S500 is finished, the process goes to S600.

In S600, a joining task is performed by the gripping apparatus of this embodiment. Here, the object 23 gripped in S500 is joined to the interface unit 22. After the joining task of S600 is finished, the process goes to S200 for another task.

In S700, after a series of tasks are finished, the process of the gripping apparatus is finished.

The task flow of the gripping apparatus of this embodiment has been thus described.

Next, the process of the gripping operation S500 in FIG. 4 will be described in detail.

Figure 5:
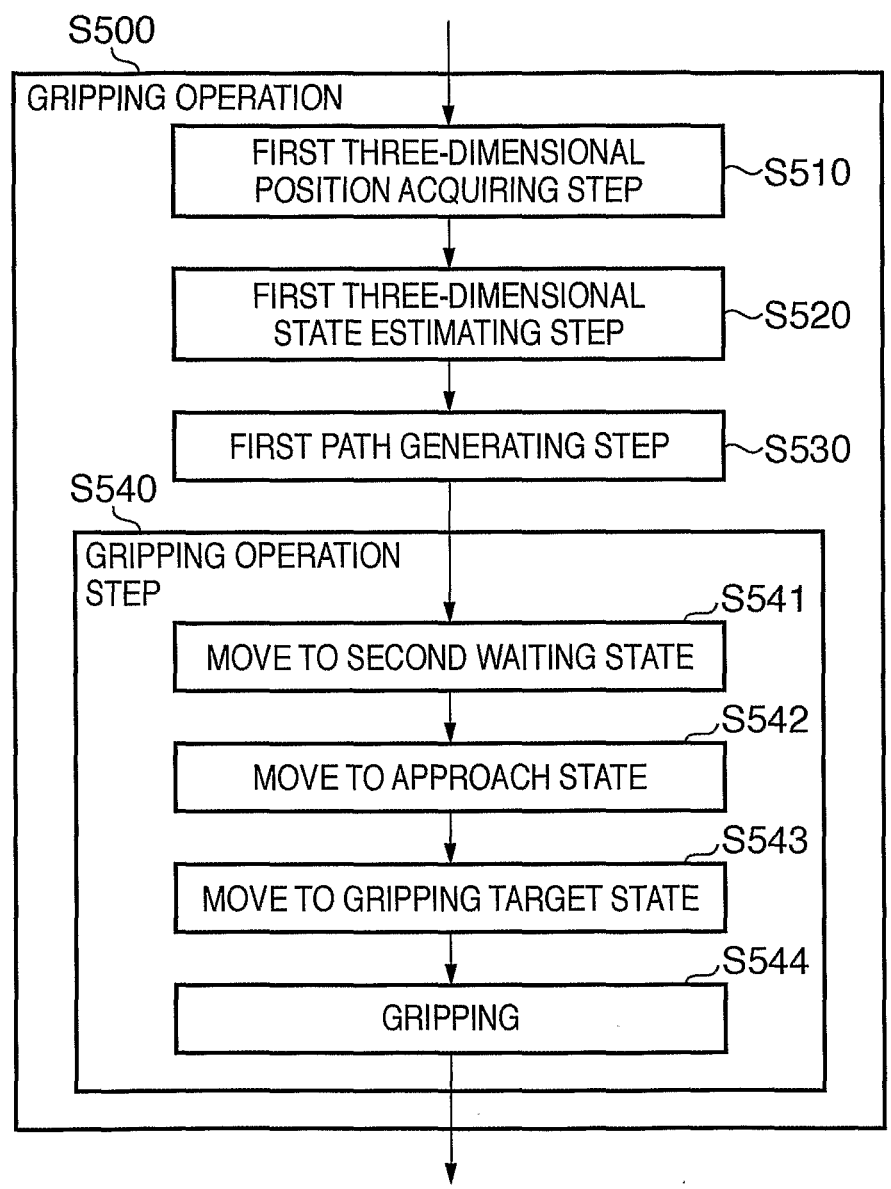
FIG. 5 is a flowchart showing a detailed process of a gripping operation S500.

FIG. 5 is a flowchart showing a detailed process of the gripping operation S500. In S510, the stereo camera A311 acquires a position of the workpiece (the printed board 21, the interface unit 22, and the object 23). In S400, it is detected whether or not the workpiece is arranged at a position that allows the gripping apparatus to perform a task, depending on whether or not the workpiece is present in a captured image. In step S510, position coordinates of the gripper A10 and the workpiece are calculated. Since the degree of freedom of the position of each of the interface unit 22 and the object 23 is high, it is difficult to predict accurate coordinates of the position from design values. Therefore, in step S510, it is necessary to detect the position coordinates. In step S510, the position coordinates of the workpiece are calculated from the left camera image (the left-end portion of FIG. 8) and the right camera image (the middle portion of FIG. 8) using a technique, such as triangulation or the like.

In S520, the calculator 41 calculates a parallax image (the right-end portion of FIG. 8) from the left camera image (the left-end portion of FIG. 8) and the right camera image (the middle portion of FIG. 8) to estimate a three-dimensional position state of the workpiece. In this embodiment, the three-dimensional position state of the workpiece refers to a position and orientation of the workpiece. The parallax image of the workpiece refers to an image that represents the magnitude of a displacement between the left camera image and the right camera image. The displacement increases with an increase in distance from the stereo camera A311 or the stereo camera A321. Therefore, distance information can be acquired from the parallax image. The magnitudes of displacements in the parallax image are color coded, for example. By analyzing the thus-acquired parallax image, the three-dimensional position state of the workpiece can be estimated.

Figure 9A:
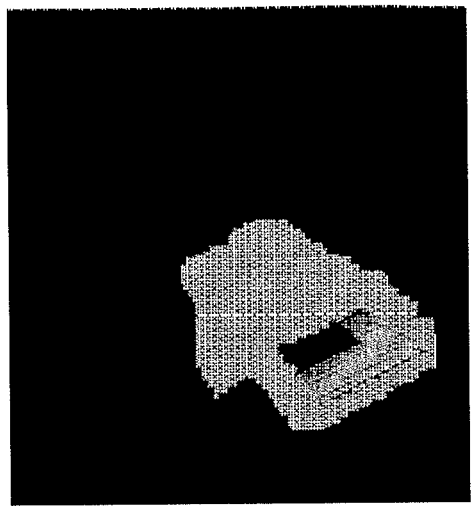
FIGS. 9A to 9D are diagrams showing images obtained by performing a threshold process with respect to a parallax image.

FIG. 9A is a diagram showing an image that is obtained by performing a threshold process that is a process of estimating the three-dimensional position state of the workpiece with respect to the parallax image. FIG. 9A is a diagram showing the object 23 extracted by the threshold process. To obtain an image as shown in FIG. 9A, a position range within which the object 23 may be located is previously obtained, and thereafter, using the position information calculated in S510, portions outside the position range may be erased by the threshold process, for example.

Figure 9B:
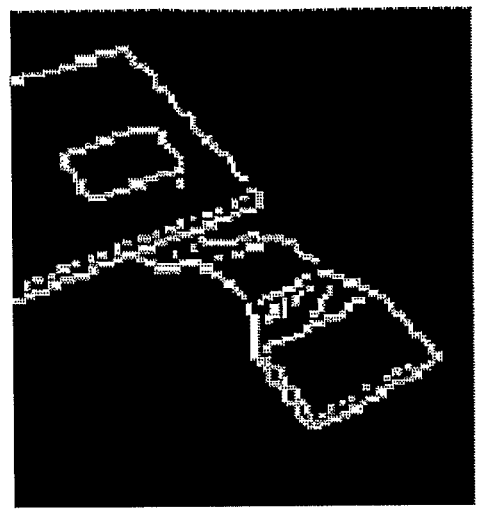

FIG. 9B shows an image that is obtained by performing an edge process that is a process of estimating the three-dimensional position state of the workpiece, with respect the left camera image or the right camera image of FIG. 8. By the edge process, edges of the printed board 21, the interface unit 22, and the object 23 are extracted, so that borders are easily recognized.

Figure 9C:
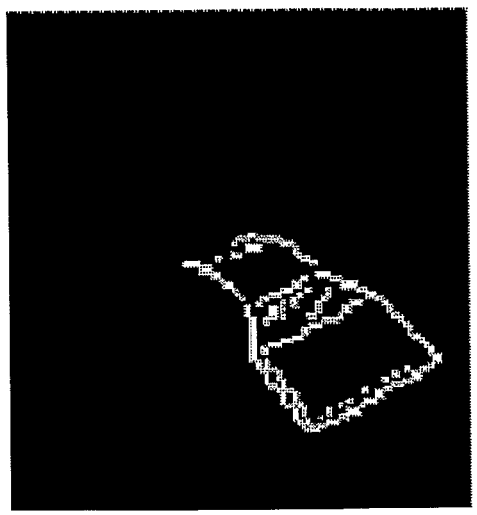

FIG. 9C shows an image that is obtained by performing the edge process with respect to the object 23. Edges of the object 23 can be extracted from the image of FIG. 9A using the image of FIG. 9B.

Figure 9D:
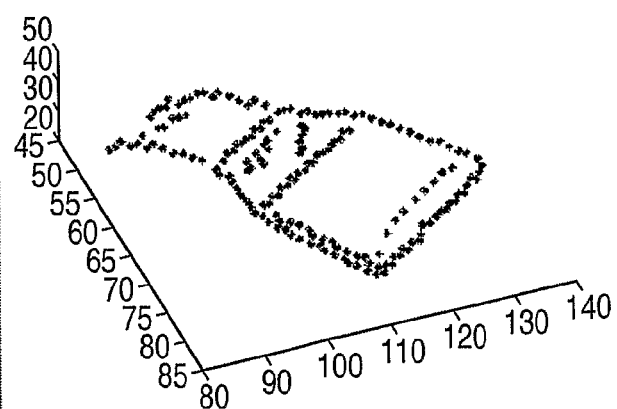

FIG. 9D is a diagram showing a state in which the edges of the object 23 are represented in a world coordinate system.

Figure 10:
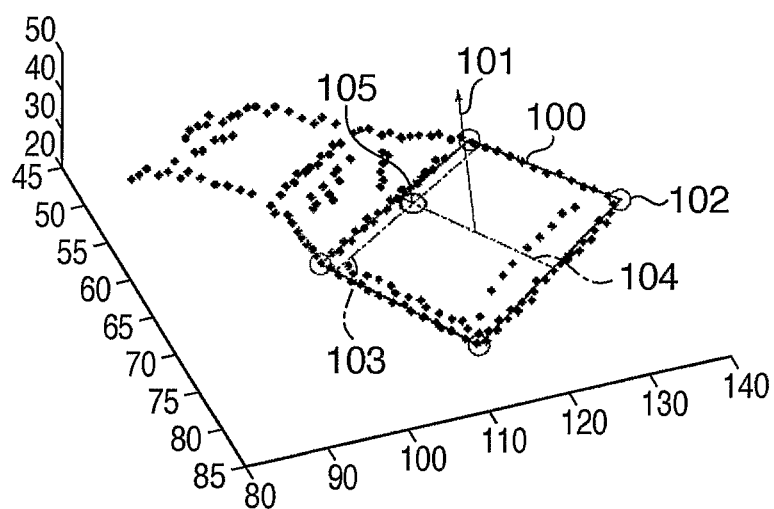
FIG. 10 is a diagram showing an image that is obtained by performing a fitting process with respect to the image obtained by the threshold process.

FIG. 10 is a diagram showing a state that is obtained by performing a fitting process that is a process of estimating a three-dimensional position state, with respect to the state of FIG. 9D. The fitting process is a process of arranging a model having a predetermined shape at an appropriate position in a three-dimensional coordinate space. In this embodiment, a rectangular model that is a shape of the object 23 is arranged so as to fit the edges of FIG. 9D. By the fitting process, a position and orientation of the object 23 can be calculated from the thus-arranged rectangular model. For example, the equation of a plane is calculated from the position coordinates of an end point 102 of the rectangular model, and a normal vector 101 is calculated from the equation of the plane, thereby making it possible to quantify the orientation of the object 23. Also, in FIG. 10, 103 indicates a position at which the object 23 is gripped (gripping position), and 104 indicates a center axis of the object 23. The gripping position 103 is previously set on the rectangular model, taking into account a material for the object 23, or the like. Also, an intersection 105 of the gripping position 103 and the center axis 104 is a gripping center target position.

In S530, the calculator 41 uses the three-dimensional position state of the object 23 estimated in S520 to perform a process of setting a movement path. The movement path refers to a path along which the robot arm 11 and the robot hand 12 are moved before gripping the object 23.

In this embodiment, when the object 23 is gripped, the robot arm 11 and the robot hand 12 are moved to a position where the fingers 13 and the object 23 overlap each other.

Figure 11:
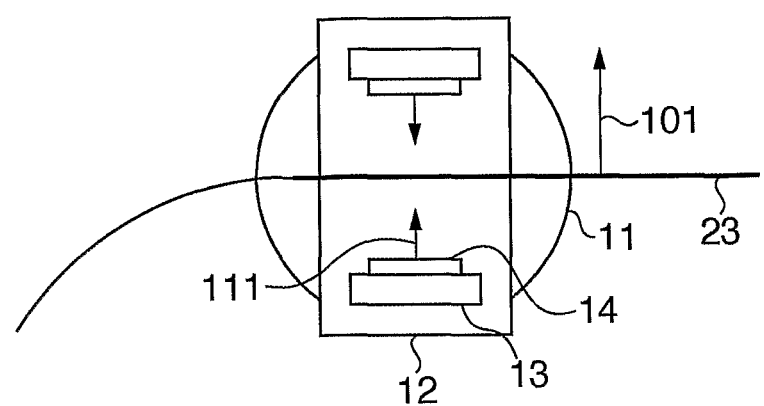
FIG. 11 is a diagram showing a state in which fingers and an object to be gripped overlap each other.

FIG. 11 is a diagram showing a state in which the robot arm 11 and the robot hand 12 have been moved to the position where the fingers 13 and the object 23 overlap each other.

Figure 12:
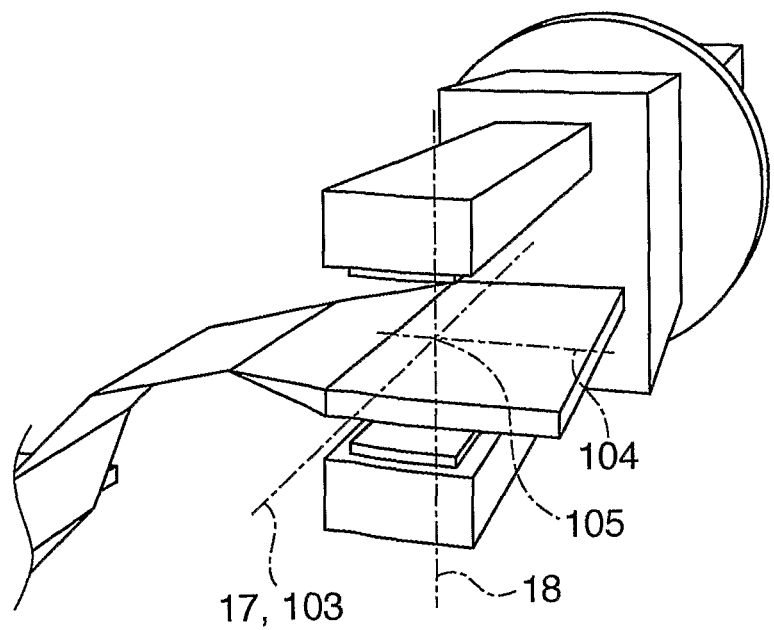
FIG. 12 is a perspective view showing the state in which the fingers and the object to be gripped overlap each other.

FIG. 12 is a diagram showing a perspective view of the robot arm 11 and the robot hand 12 that have been moved to a position similar to that of FIG. 11. As shown in FIGS. 11 and 12, the normal vector of the gripping surface 14 of the finger 13 and the normal vector calculated in S510 are caused to be parallel to each other, and thereafter, if the fingers 13 are closed, the object 23 can be smoothly gripped.

The movement path generated in this step is a path along which the robot arm 11 and the robot hand 12 are moved to the state of FIG. 11 or FIG. 12. To generate the movement path, a second waiting state, an approach state, and a gripping target state are set.

The second portion from the left end of FIG. 7 shows the second waiting state, the third portion shows the approach state, and the right-end portion shows the gripping target state. In this embodiment, when gripping is performed, the robot arm 11 and the robot hand 12 are moved from the second waiting state to the approach state, and further, from the approach state to the gripping target state. Hereinafter, each state will be described.

The second waiting state refers to a movement starting position when gripping is performed. The second waiting state is calculated as follows. A plurality of second waiting states suitable for gripping is previously recorded in a Look-Up Table (LUT) or the like, and an appropriate second waiting state is selected from the LUT. The second waiting state is selected and determined, depending on whether or not a singular point is present on a movement curve, such as a spline curve or the like, linking between the approach state and each second waiting state. Since a velocity vector is zero on the singular point, a malfunction may occur when the robot arm 11 and the robot hand 12 are moved on the singular point. Therefore, a second waiting state for which a singular point is not present on the calculated movement curve is selected. Therefore, the approach state needs to be calculated before the second waiting state is selected.

The approach state refers to a state immediately before the fingers 13 and the object 23 overlap each other.

Figure 13:
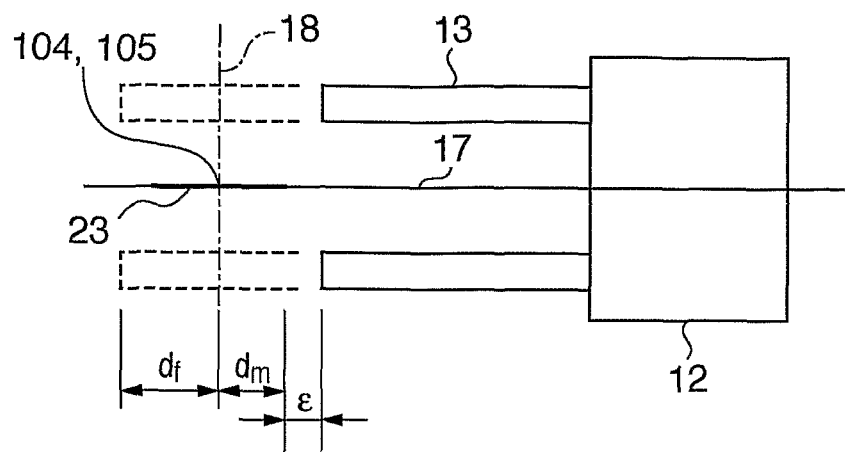
FIG. 13 is a diagram showing a relationship between an approach state and a gripping target state in the first embodiment.

FIG. 13 is a diagram showing the approach state in this embodiment. The approach state in this embodiment is a state in which the fingers 13 are moved from the gripping target state by a predetermined distance in a pulling direction. In this case, for example, as shown in FIG. 13, the predetermined distance is assumed to be the sum of the sum of a distance df from a gripping center reference position 15 to a tip position of the finger 13 and a distance dm between a lateral edge of the rectangular model and the center axis 104 (i.e., half a width of the object 23), and a margin $\epsilon$. By setting the predetermined distance as shown in FIG. 13, it is possible to avoid interference between the fingers 13 and the object 23.

The gripping target state refers to final positions and orientations of the robot arm 11 and the robot hand 12 for gripping the object 23. In the final position and orientation, the normal vector of the gripping surface 14 of the finger 13 is parallel to the normal vector calculated in S510. Also, when gripping, the gripping position 103 shown in FIG. 10 and the finger center reference line 16 shown in FIG. 3 need to coincide with each other. Similarly, the gripping center target position 105 and the gripping center reference position 15 need to coincide with each other. To meet these conditions, the gripping target state is set so that the gripper center line 17 coincides with the gripping position 103, and a line 18 linking the gripping center reference positions 15 of both the fingers 13 passes through the gripping center target position 105.

A movement path is generated by linking the positions and orientations of the second waiting state, the approach state, and the gripping target state using a spline function or the like.

Figure 14:
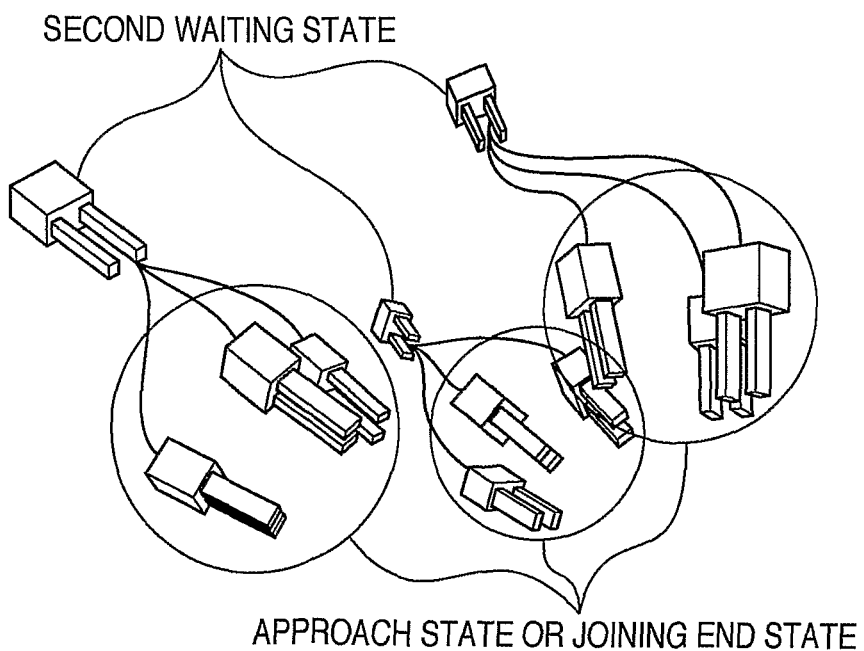
FIG. 14 is a conceptual diagram showing a first movement path in the first embodiment.

FIG. 14 is a diagram showing the concept of the movement path. As shown in FIG. 14, the movement paths of the robot arm 11 and the robot hand 12 vary depending on the position and orientation of the object 23.

In S540, the robot controller 10 transmits a movement instruction based on the generated movement path so as to move the robot arm 11 and the robot hand 12, followed by a gripping operation. S540 includes S541 to S544 described below.

In S541, the robot arm 11 and the robot hand 12 are moved from the first waiting state (initial state) to the second waiting state.

In S542, the robot arm 11 and the robot hand 12 are moved from the second waiting state to the approach state.

In S543, the robot arm 11 and the robot hand 12 are moved from the approach state to the gripping target state.

In S544, in the gripping target state, the fingers 13 are closed to grip the object 23.

Next, the process of the joining task S600 of FIG. 4 will be described in detail. S600 includes S611 to S647. A movement path for the joining task of S600 is also generated by linking a plurality of states of the robot arm 11 and the robot hand 12 as in the gripping task of S500.

FIGS. 15A to 15F are diagrams showing states of the robot arm 11 and the robot hand 12 in each step of S600 of this embodiment. Hereinafter, a detail of each state and its calculation method will be described.

Figure 15C:
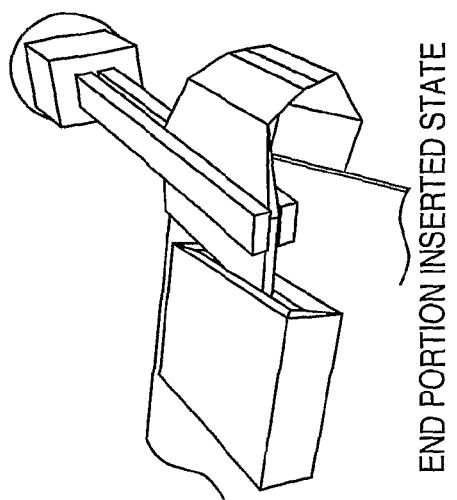
FIGS. 15A to 15F are diagrams showing states of a gripper in steps in S600 of the first embodiment.
Figure 15F:
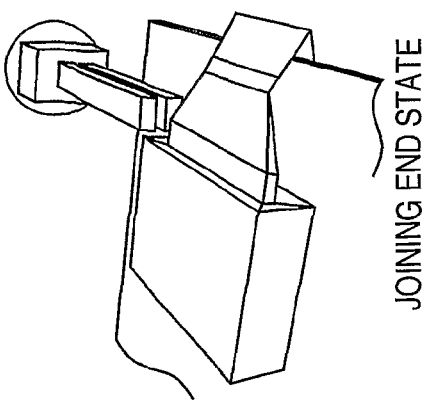
Figure 15B:
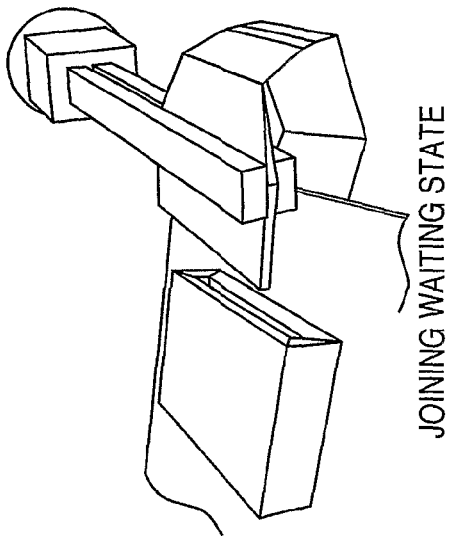
Figure 15E:
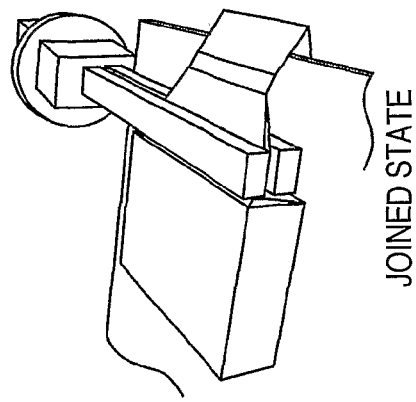
Figure 15A:
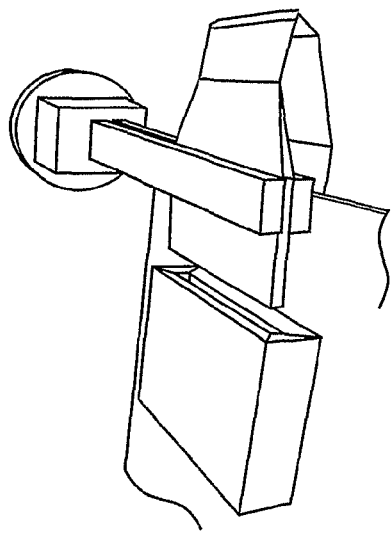

FIG. 15A is a diagram showing a state (pre-joined state) before the object 23 is joined to the interface unit 22. The pre-joined state refers to a state in which the object 23 is located in front of the interface unit 22 to be ready for joining.

Figure 16:
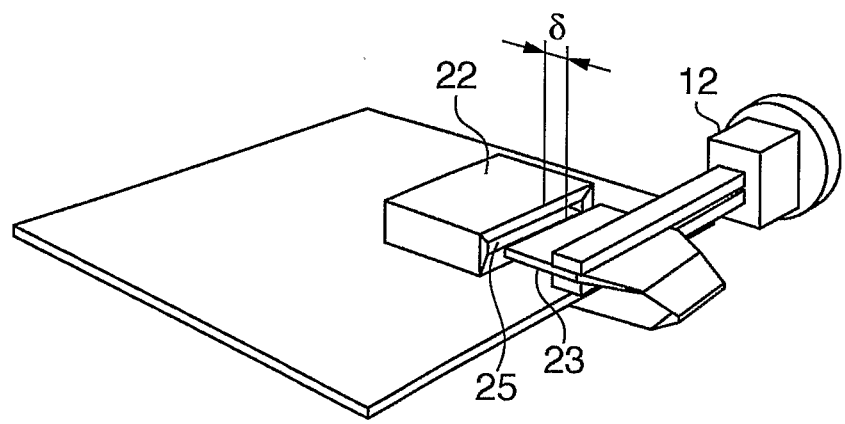
FIG. 16 is a diagram showing a pre-joined state in the first embodiment.

FIG. 16 is a diagram showing the pre-joined state in this embodiment.

In FIG. 16, 25 indicates a joint portion of the interface unit 22.

As shown in FIG. 16, the pre-joined state of this embodiment refers to a state in which the object 23 is spaced by a predetermined distance $\delta$ (e.g., $\delta = 5$ mm) from and in front of the joint portion 25 of the interface unit 22 while being maintained in parallel with the interface unit 22. Note that a relationship in position between the interface unit 22 and the object 23 is not necessarily desirable, due to the attachment tolerance of the interface unit 22, the displacement of the object to be gripped or the like.

FIG. 15B is a diagram showing a joining waiting state immediately before the start of insertion of an end point of the object 23 when the object 23 is joined to the interface unit 22. The joining waiting state refers to a state in which the object 23 has been moved by a predetermined distance from an end portion inserted state in a direction opposite to an insertion direction. Note that, in order to cause the object 23 to smoothly go from the pre-joined state via the joining waiting state to the end portion inserted state, the object 23 is desirably closer to the interface unit 22 than in the pre-joined state and desirably has not yet entered the inside of the joint portion 25, in the joining waiting state.

FIG. 15C is a diagram showing the end portion inserted state in which an end of the object 23 is inserted in the interface unit 22 so as to join the object 23 to the interface unit 22. The reason why an end of the object 23 is inserted into the interface unit 22 is that a failure of joining can be avoided. For example, when the object 23 is inserted into the interface unit 22, the insertion may fail since the object 23 is not parallel to the interface unit 22, due to a mechanical error or the like. Therefore, by initially inserting an end of the object 23 into the interface unit 22, the possibility of insertion failure can be reduced.

Hereinafter, a method for calculating the end portion inserted state will be described.

Figure 17A:
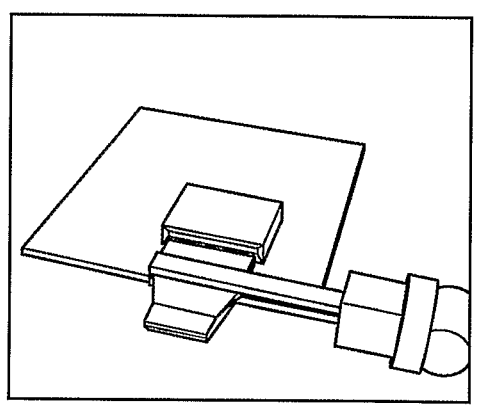
FIGS. 17A and 17B are diagrams showing a state in which an object to be gripped is located in the vicinity of a joint portion.

FIG. 17A is a diagram showing a state in which the object 23 is located in the vicinity of the joint portion 25. An image as shown in FIG. 17A can be acquired by shooting the state of FIG. 16. By performing a fitting process similar to the process of S520 with respect to the acquired image, three-dimensional position states of the object 23 and the interface unit 22 can be estimated to calculate the end portion inserted state.

Figure 17B:
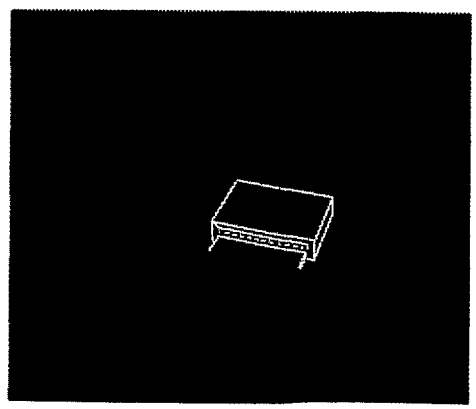

FIG. 17B is a diagram showing a state that is obtained by performing a threshold process and an edge process with respect to FIG. 17A as in S520.

Figure 18:
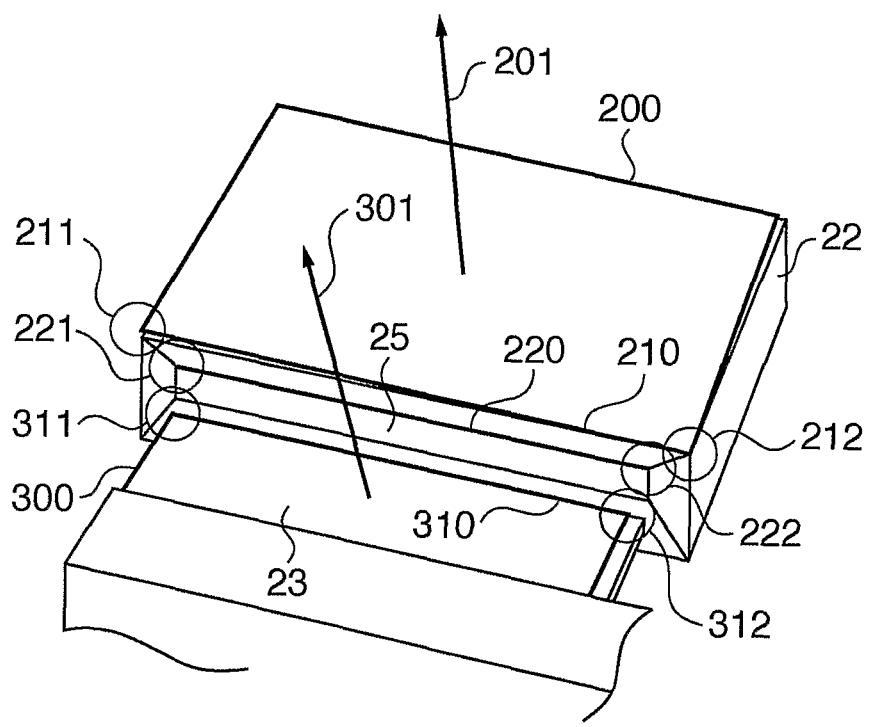
FIG. 18 is a diagram showing a state in which a fitting process has been performed.

FIG. 18 is a diagram showing a state that is obtained by performing a fitting process with respect to image data as shown in FIG. 17B. As shown in FIG. 18, a rectangular model 200 is used with respect to the interface unit 22, and a squared U-shaped model 300 is used with respect to the object 23. As shown in FIG. 18, a position and orientation of the object 23 can be calculated by a fitting process as in S520. Also, a position and orientation of the joint portion 25 can be calculated by a fitting process using a line segment-shaped model 220. Note that 201 indicates a normal vector with respect to the rectangular model 200, and 301 indicates a normal vector with respect to the squared U-shaped model 300. 311 and 312 indicate end points of the squared U-shaped model 300, 221 and 222 indicate end points of the line segment-shaped model 220, and 211 and 212 indicate end points of the rectangular model 200.

Hereinafter, a method for calculating a position and orientation in the end portion inserted state based on the information of FIG. 18 will be described.

In this embodiment, in order to reduce the possibility that the object 23 fails to be inserted, the object 23 is inserted obliquely to the joint portion 25. If the object 23 is inserted parallel to the joint portion 25, the object 23 is likely to contact the interface unit 22 due to a slight error, leading to a failure in insertion. Also, when the object 23 is inserted obliquely to the joint portion 25, a slight error may occur. In this case, however, after the object 23 contacts the interface unit 22, a position where the object 23 contacts the interface unit 22 is displaced, so that the object 23 can be successfully inserted into the interface unit 22.

Figure 19B:
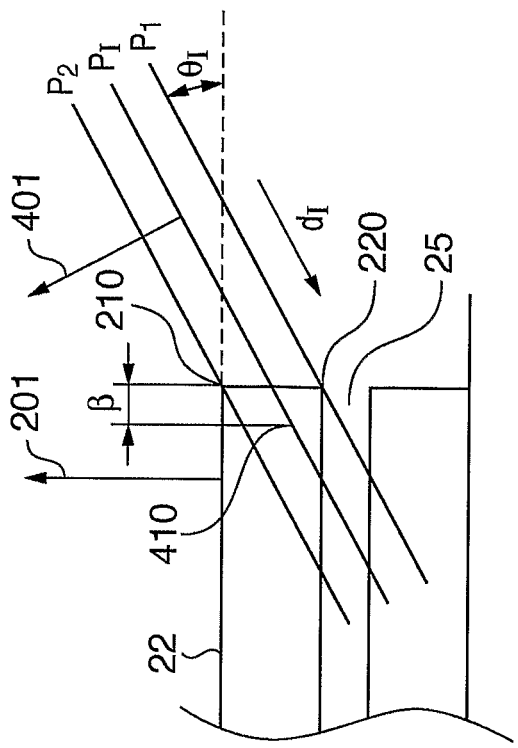
FIGS. 19A and 19B are conceptual diagrams showing a state when a position and orientation in an end portion inserted state are calculated.
Figure 19A:
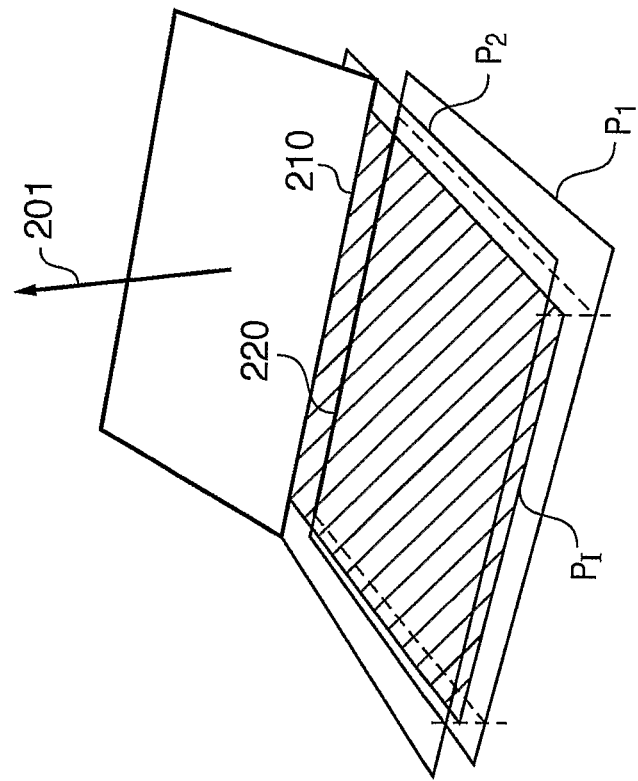
Figure 20:
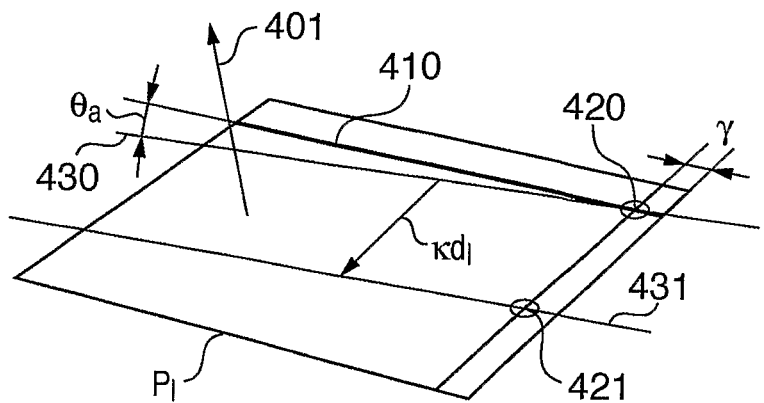
FIG. 20 is a conceptual diagram showing a state when the position and the orientation in the end portion inserted state are calculated.

FIGS. 19A and 19B, FIG. 20, and FIGS. 21A and 21B are conceptual diagrams showing how positions and orientations in the end portion inserted state are calculated. As shown in FIG. 19A, initially, a plane P1 that has an angle of elevation θI (e.g., θI=15°) and passes through the line segment-shaped model 220 is set with respect to the line segment-shaped model 220. Thereafter, a plane P2 that is parallel to the plane P1 and passes through a line segment 210 is set. A plane PI that is interposed between the plane P1 and the plane P2 and is parallel to both the planes is set. A distance between P1 and PI is assumed to have a small value within the tolerance range of the copying mechanism of the gripper A10, and is set, taking into account a size of the interface unit 22, the elasticity of the object 23, and an error in small movement of the robot arm 11. For example, when the distance between the plane P1 and the plane P2 is 0.5 mm, the distance between P1 and PI is set to be 0.1 mm. The plane PI is also assumed to be a plane having a finite width that is equal to a width of a joint portion estimated from the end points 221 and 222 of the line segment 220 with respect to a width direction of the joint portion 25.

Note that an operation directional vector dI of an end portion insertion operation is defined as a vector that is orthogonal to a directional vector of the line segment 210 or 220 and is orthogonal to a normal vector 401 of the plane PI. The operation directional vector dI is used when the joining waiting state described above is calculated from the end portion inserted state.

Figure 21A:
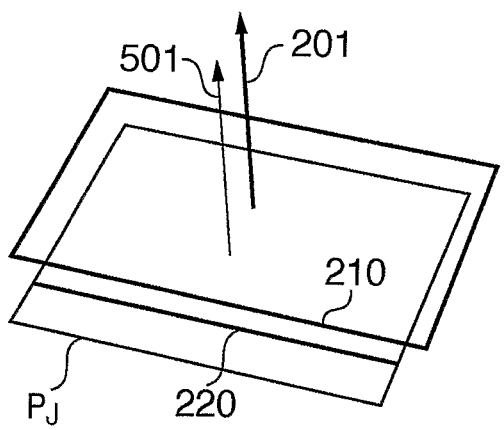
FIGS. 21A and 21B are conceptual diagrams showing a state when the position and the orientation in the end portion inserted state are calculated.
Figure 21B:
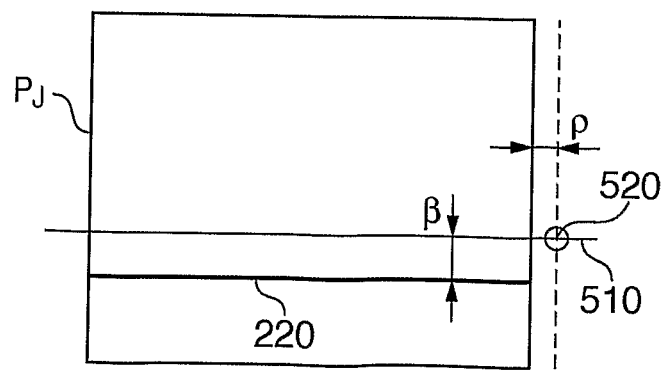

Next, a plane PJ that passes through the line segment 220 that is an edge of the joint portion 25, and has the normal vector 501 having the same direction as that of the normal vector 201 of the interface unit 22, as shown in FIGS. 21A and 21B, will be considered. The plane PJ has a finite width that is the width of the joint portion estimated from the end points 221 and 222 of the line segment 220 with respect to the width direction of the joint portion 25 as with the plane PI. A line 510 that is spaced from the line segment 220 by a distance corresponding to a small insertion amount β is drawn on the plane PJ. A point 520 that is located on the line 510 and at a distance ρ from an end in the width direction of the plane PJ, is assumed to be a target position for the end point 312 of the object 23 in the end portion inserted state. It is here assumed that ρ is a small amount that is within the tolerance range of the copying mechanism of the gripper. In the end portion inserted state of the object 23, the end point 312 coincides with the end point target position 520, a line segment 310 is present on the line 510, and the normal vector 301 of the object 23 matches the normal vector 501 of the plane PJ.

By the process described above, the position and orientation of the object 23 in the end portion inserted state can be calculated.

Figure 15D:
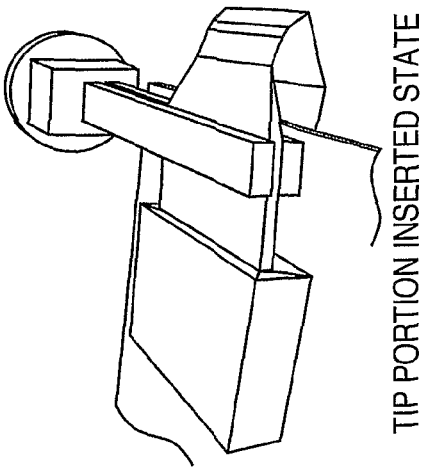

FIG. 15D is a diagram showing a tip portion inserted state in which the other end that is not inserted in the end portion inserted state of FIG. 15C is inserted in the interface unit 22.

The tip portion inserted state can be calculated by obtaining the end point target position of the end point 311 of the object 23 as with the end portion inserted state.

FIG. 15E is a diagram showing a joined state in which the object 23 is joined to the interface unit 22 by insertion from the tip portion inserted state of FIG. 15D in a joining direction.

Figure 22:
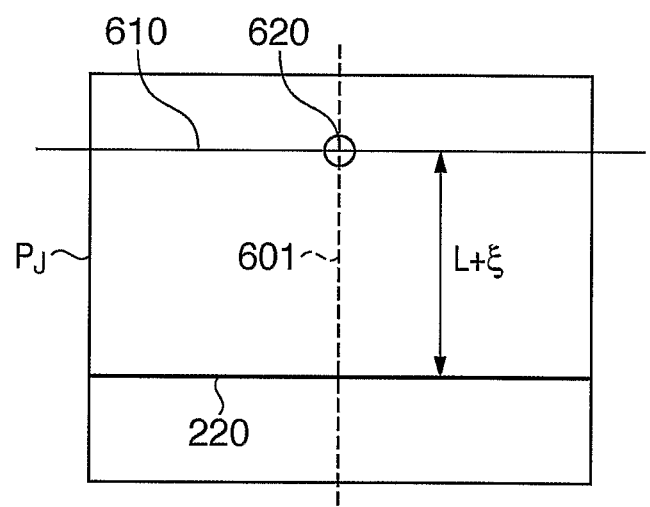
FIG. 22 is a conceptual diagram showing a state when a joined state is calculated.

FIG. 22 is a conceptual diagram showing how the joined state is calculated. On the plane PJ that is obtained when the end portion inserted state is calculated, a line 610 that is located at a distance L+ξ from the line segment 220 is set, where L is an amount by which the object 23 needs to be pushed so as to be joined to the interface unit 22 (L is determined based on set values of the interface unit 22 and the object 23), and ξ is a small amount within the tolerance range of the copying mechanism of the robot hand 12. An intersection of a center line 601 of the plane PJ and the line 610 is assumed to be a target position 620 related to a center position of the tip portion of the object 23. In the joined state of the object 23, a middle point between the end points 311 and 312 coincides with the target position 620, the line segment 310 is present on the line 610, and the normal vector 301 of the object 23 matches the normal vector 501 of the plane PJ.

By the process described above, the position and orientation of the object 23 in the joined state can be calculated.

FIG. 15F is a diagram showing a joining end state in which, from the joined state of FIG. 15E, the fingers 13 are opened and the robot hand 12 is pulled out without interfering with the object 23.

The joining end state is calculated in a manner similar to that of the approach state in S520. Specifically, from the joined state, the robot hand 12 is moved and pulled out along the gripper center line 17. In this case, a movement distance is assumed to be the sum of the sum of the distance df from the gripping center reference position 15 to the tip position of the finger 13 and half the width of the object 23 (i.e., the distance dm between the lateral edge of the rectangular model and the center axis 104), and the margin ϵ.

Figure 6:
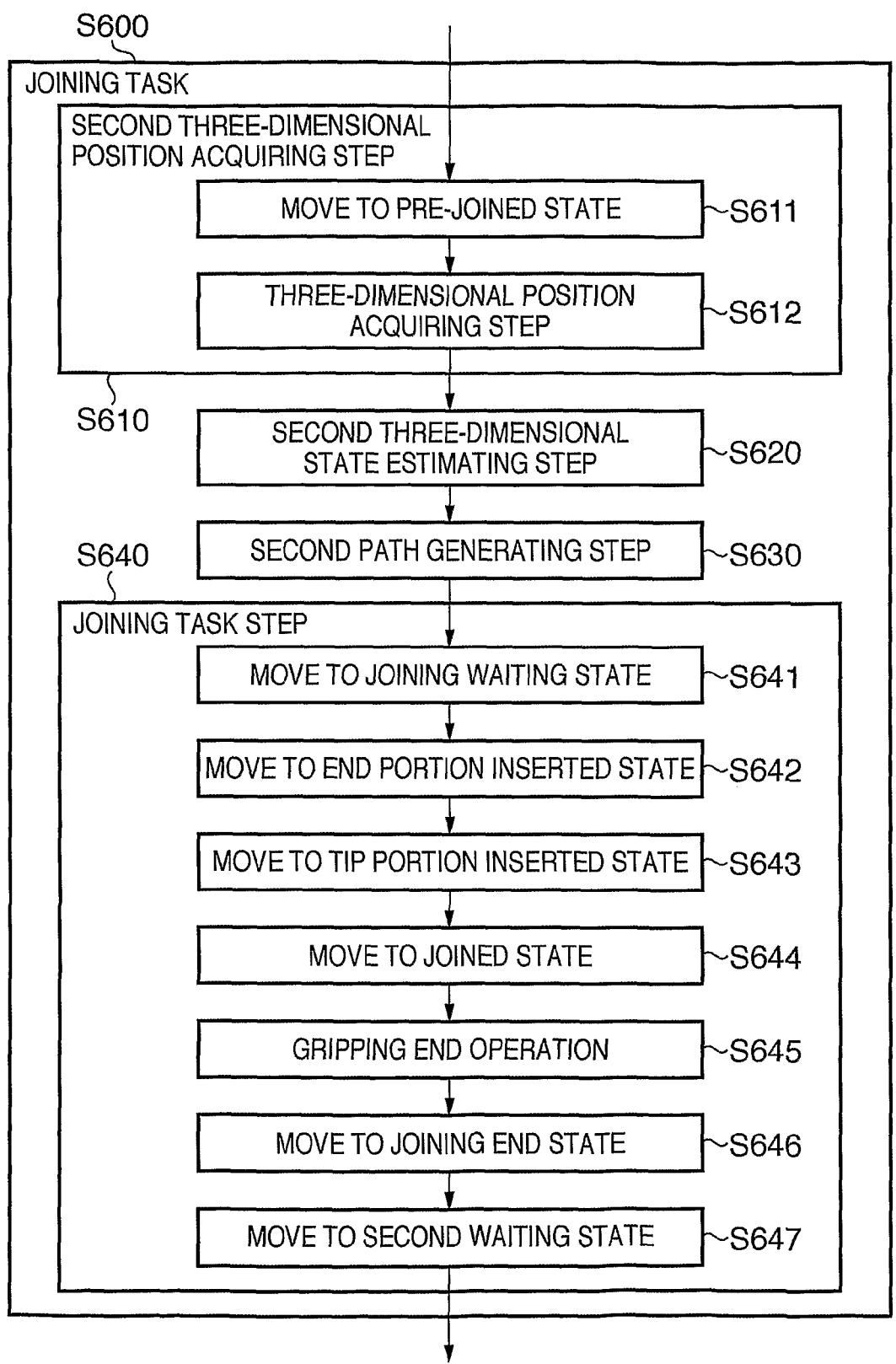
FIG. 6 is a diagram showing a flow of each step of a joining task S600.

FIG. 6 is a diagram showing a flow of each step of S600. Each step of S600 will be described with reference to FIG. 6. Each step of S600 is performed by driving the robot arm 11 and the robot hand 12 in accordance with an instruction transmitted from the robot controller 10.

In S611, the robot controller 10 causes the robot arm 11 and the robot hand 12 to move to their pre-joined states.

In S612, the stereo camera A321 captures an image of the workpiece, thereby acquiring a position of the workpiece. The process of this step is substantially similar to that of S510.

In S620, as is substantially similar to the process of S510, the calculator 41 calculates a parallax image (the right-end portion of FIG. 8) from the left camera image (the left-end portion of FIG. 8) and the right camera image (the middle portion of FIG. 8) of the stereo camera A321 to estimate a three-dimensional position state of the workpiece. Specifically, the three-dimensional position and orientation of the workpiece are calculated as described about the calculation of each state of FIG. 15.

In S630, the calculator 41 generates a second path that is to be used during a joining task.

When the second path is generated, the above-described states of FIG. 15 are used. The second path is generated by linking the states of FIG. 15 using a spline function or the like. A joining task can be performed by moving the robot arm 11 and the robot hand 12 along the second path.

In S640 and thereafter, the object 23 is joined to the interface unit 22. In the joining task step, the robot arm 11 and the robot hand 12 are moved along the second path, that is, from S641 (joining waiting state), to S642 (end portion inserted state), to S643 (tip portion inserted state), and to S644 (joined state).

In S645, the robot controller 10 drives the fingers 13 in a release direction with respect to the object 23 (gripping end operation).

In S646, the robot controller 10 moves the robot arm 11 and the robot hand 12 to their joining end states.

In S647, for the next gripping operation, the robot controller 10 moves the robot arm 11 and the robot hand 12 to their second waiting states. In this case, the calculator 41 selects a second waiting state corresponding to the joining end state by calling a stored LUT or an identification function.

After S200 to S600, the process returns to S200, in which the next task is waited for.

By performing the process described above, for example, a complicated gripping operation task for engaging a flexible cable with a connecter can be smoothly performed. Note that each step of FIG. 4 may be performed by a computer comprising a storage device storing a program for controlling the gripping apparatus, a CPU and the like.

(Second Embodiment)

Figure 23:
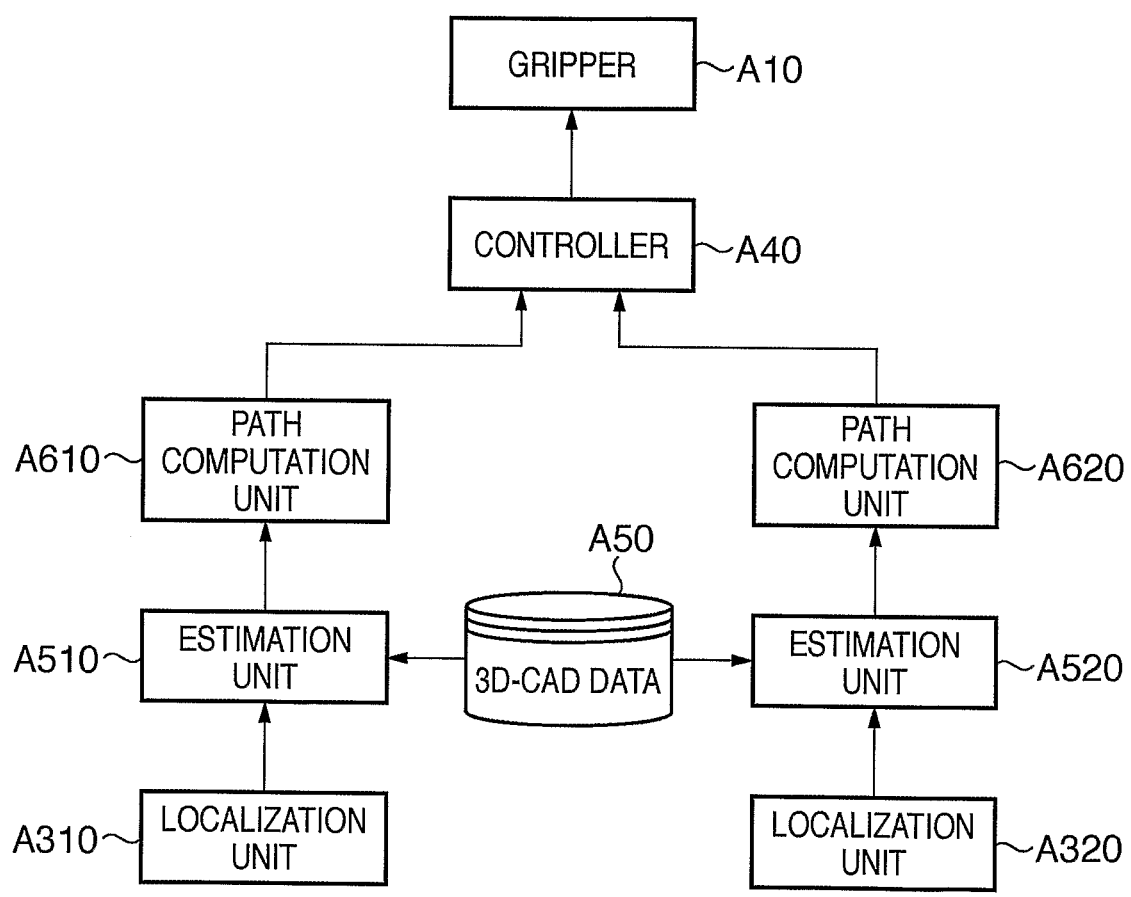
FIG. 23 is a diagram showing a functional configuration of a gripping apparatus according to a second embodiment of the present invention.

FIG. 23 is a diagram showing a functional configuration of this embodiment. As shown in FIG. 23, the basic configuration is similar to that of FIG. 1 of the first embodiment. This embodiment is different from the first embodiment in that 3D-CAD data A50 is provided. The 3D-CAD data A50 stores data of accurate outer shapes of the object 23, the interface unit 22 and the like. These pieces of data can be used instead of parametric model data, such as the rectangular model, the squared U-shaped model or the like, thereby making it possible to perform a more accurate fitting process. The more accurate fitting process improves the accuracy of estimation of the positions and orientations of the object 23 and the interface unit 22. Therefore, the set values β, γ and ρ that depend on the copying mechanism of the robot hand 12 can be set to be smaller values, resulting in an improvement in accuracy of a task.

(Third Embodiment)

Figure 24:
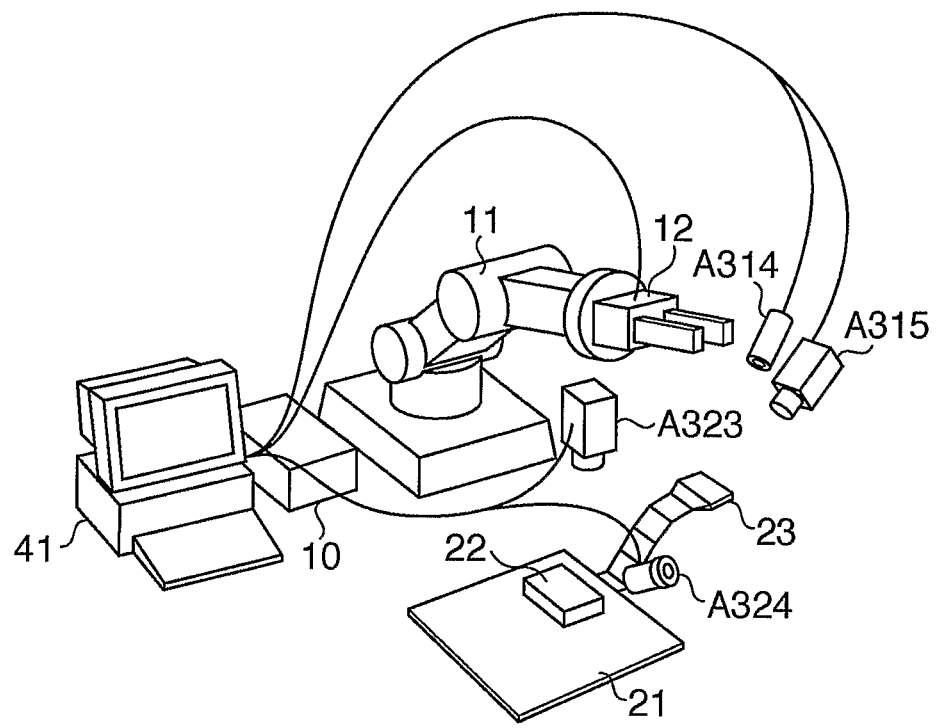
FIG. 24 is a diagram showing a configuration of a gripping apparatus according to a third embodiment of the present invention.

FIG. 24 is a diagram showing a configuration of a gripping apparatus according to this embodiment. As can be seen from FIG. 24, the basic configuration is similar to that of FIG. 2 of the first embodiment. This embodiment is different from the first embodiment in that the stereo camera A311 and the stereo camera A321 are replaced with other means. Instead of the stereo camera A311, a first camera A313 and a first lighting unit A314 are provided. Also, instead of the stereo camera A321, a second camera A323 and a second lighting unit A324 are provided. The lighting unit is desirably of the multi-slit ray type that can emit two or more slit rays. Alternatively, the lighting unit may be of the scan type using a galvanometer mirror or a polygon mirror.

In this embodiment, when image capture is performed, slit rays are initially emitted from the lighting unit at a predetermined angle with respect to a camera optical axis. Thereafter, positions irradiated with the slit rays are detected from an image captured by the camera, and depth information about an object whose image is captured is acquired using the principle of triangulation. This technique is generally called a light section method. In this embodiment, the light section method using the lighting units and the cameras can be used instead of the stereo cameras, thereby making it possible to detect a three-dimensional position and orientation of an object whose image is captured.

(Fourth Embodiment)

Figure 25:
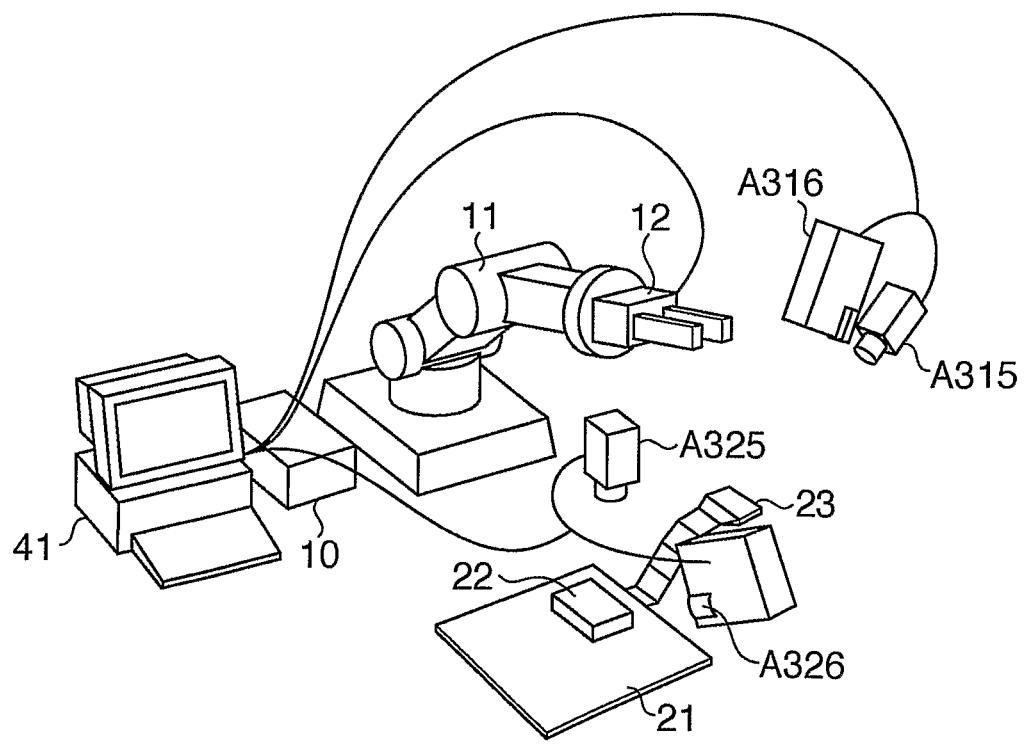
FIG. 25 is a diagram showing a configuration of a gripping apparatus according to a fourth embodiment of the present invention.

FIG. 25 is a diagram showing a configuration of a gripping apparatus according to this embodiment. As can be seen from FIG. 25, the basic configuration is similar to that of FIG. 2 of the first embodiment. This embodiment is different from the first embodiment in that the stereo camera A311 and the stereo camera A321 are replaced with other means. Instead of the stereo camera A311, a first camera A315 and a first projector A316 are provided. Also, instead of the stereo camera A321, a second camera A325 and a second projector A326 are provided. In this embodiment, by using the cameras and the projectors instead of the stereo cameras, a position of an object whose image is captured can be measured by spatial coding. In the spatial coding, a coded pattern is initially projected from a projector onto an object whose image is captured. Thereafter, the coded pattern is detected from an image captured by a camera, and depth information about the object whose image is captured is acquired based on the principle of triangulation.

In this embodiment, a three-dimensional position and orientation of an object whose image is captured can be detected using projectors and cameras instead of stereo cameras.

(Fifth Embodiment)

Figure 26:
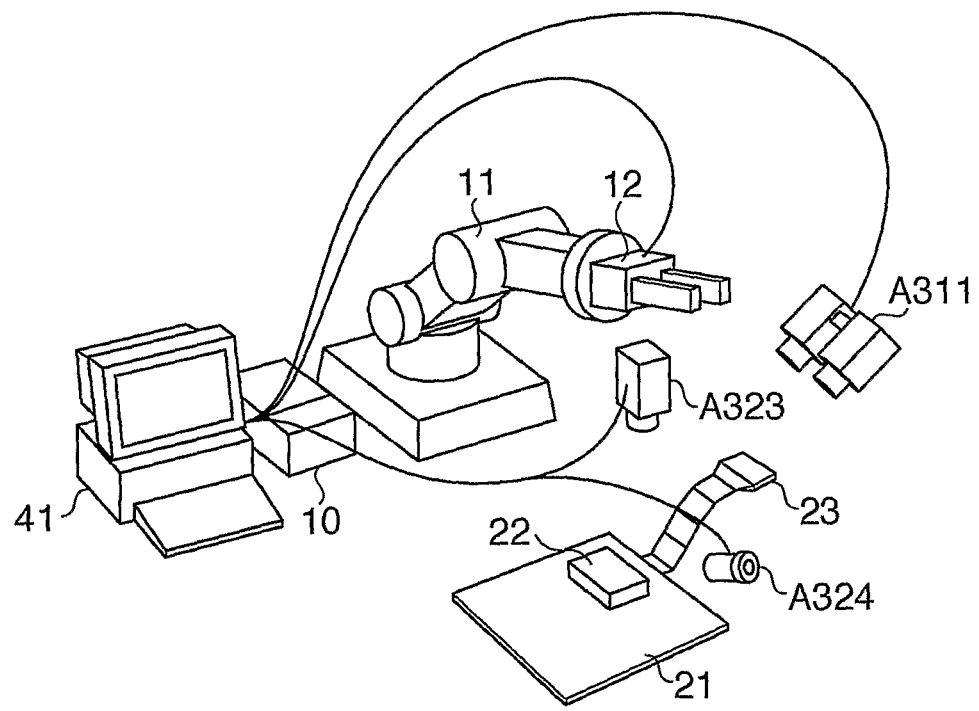
FIG. 26 is a diagram showing a configuration of a gripping apparatus according to a fifth embodiment of the present invention.

FIG. 26 is a diagram showing a configuration of a gripping apparatus according to this embodiment. As can be seen from FIG. 26, the basic configuration is similar to that of FIG. 2 of the first embodiment. This embodiment is different from the first embodiment in that the stereo camera A321 is replaced with another means. Instead of the stereo camera A321, a first camera A323 and a lighting unit A324 are provided. In this embodiment, a stereo camera is used for image capture during gripping, and the camera and the lighting unit are used for image capture during joining of the object 23. The process of an image captured by the camera and the lighting unit is similar to that of the third embodiment.

Note that, as a variation of this embodiment, a camera and a lighting unit may be used instead of the stereo camera A311. Alternatively, a projector and a camera may be used instead of the camera and the lighting unit, to detect a position and orientation of an object whose image is captured using a method similar to that of the fourth embodiment.

(Sixth Embodiment)

Figure 28:
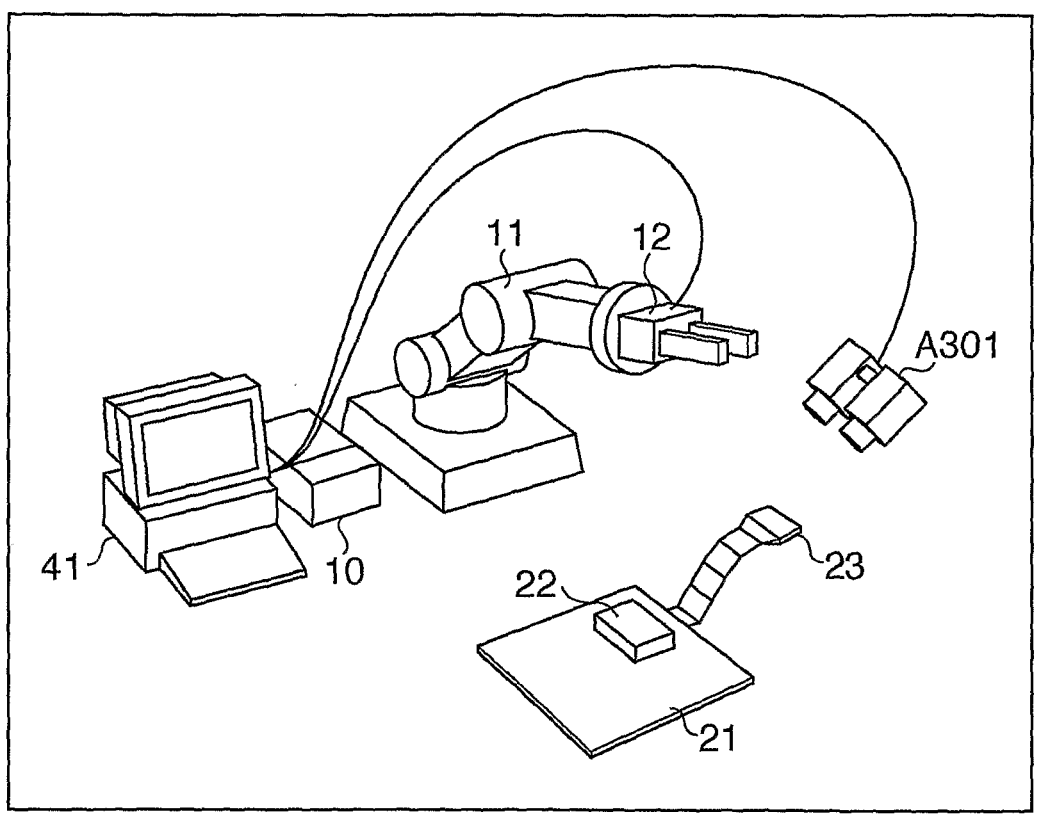
FIG. 28 is a diagram showing a configuration of the gripping apparatus of the sixth embodiment.

FIG. 28 is a diagram showing a configuration of a gripping apparatus according to this embodiment. As can be seen from FIG. 28, the basic configuration is similar to that of FIG. 2 of the first embodiment. This embodiment is different from the first embodiment in that the stereo camera A321 is not provided. In this embodiment, a stereo camera A301 is provided at position that allows image capture of the object 23 during gripping and joining. The stereo camera A301 is used to perform image capture during gripping and joining.

Figure 27:
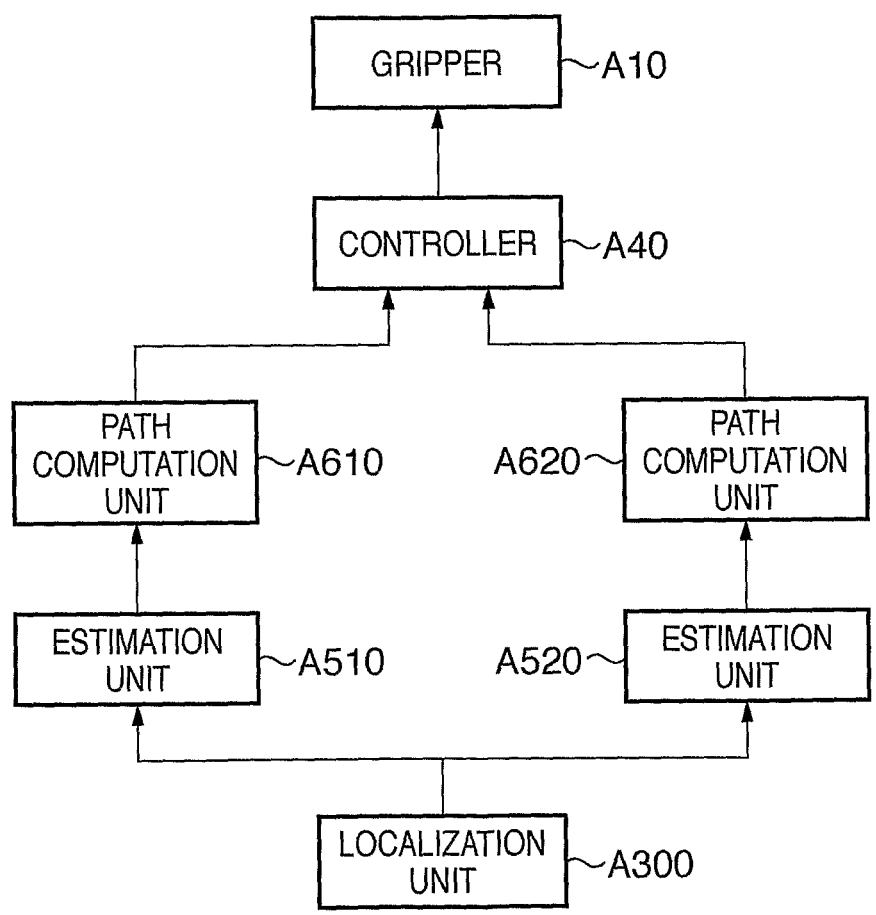
FIG. 27 is a diagram showing a functional configuration of a gripping apparatus according to a sixth embodiment of the present invention.

FIG. 27 is a diagram showing a functional configuration of a gripping apparatus according to this embodiment. As can be seen from FIG. 27, the basic configuration is similar to that of FIG. 1 of the first embodiment. This embodiment is different from the first embodiment in that the functions of the localization unit A310 and the localization unit A320 are achieved by a localization unit A300. The localization unit A300 corresponds to the stereo camera A301 of FIG. 28.

As described above, by providing the stereo camera A301 at an appropriate position, gripping and joining operations can be performed without providing a stereo camera, so that the manufacturing cost of the apparatus can be reduced.

According to the present invention, the control of a gripping apparatus that requires a complicated gripping operation can be smoothly performed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An apparatus comprising:
a first obtaining unit configured to obtain an image of an object in a state where the object held by a holding unit is in front of an interface unit and is not inserted into the interface unit;
a storing unit configured to store a first model of the object and a second model of the interface unit;
a second obtaining unit configured to obtain a relative position and orientation between the object and the interface unit based on the first model, the second model and the obtained image;
a calculating unit configured to calculate a first position and orientation of the object and a second position and orientation of the object based on the obtained relative position and orientation of the object, wherein the first position and orientation corresponding to a condition that a portion of the object is obliquely inserted in the interface unit, the second position and orientation corresponding to a condition that the object has been inserted in the interface unit;
a movement path generating unit configured to generate a movement path which is from a position and orientation of the object held by a holding unit in a state where the object is in front of an interface unit and is not inserted into the interface unit, to the second position and orientation through the first position and orientation of the object; and
a controller configured to move the holding unit along the generated movement path.

2. The apparatus according to claim 1, wherein the controller is configured to move the holding unit along the generated movement path and to cause the holding unit to insert the object into the interface unit.

3. The apparatus according to claim 2, wherein:
the movement path generating unit sets a first movement path of the holding unit when the holding unit holds the object, based on first information,
the movement path generating unit sets a second movement path of the holding unit which is used when the holding unit inserts the object into the interface unit, based on second information,
the controller moves the holding unit along the set first movement path and causes the holding unit to hold the object, and
the controller moves the holding unit holding the object along the set second movement path, and causes the holding unit to insert the object into the interface unit.

4. The apparatus of claim 3, wherein the movement path generating unit calculates a curve leading to a target state suitable for gripping the object as the first movement path.

5. The apparatus according to claim 1, further comprising an information obtaining unit configured to obtain parametric model data of a position and orientation of the object.

6. The apparatus according to claim 5, wherein the parametric model data shows a model having a rectangular shape.

7. The apparatus according to claim 1, wherein the movement path generating unit sets a plurality of orientations of the holding unit, and the movement path generating unit generates the movement path passing through the plurality of orientations.

8. The apparatus according to claim 5, wherein the parametric model data shows a model having an outer shape of the object obtained from CAD data.

9. The apparatus according to claim 1, wherein the obtaining unit has a plurality of cameras.

10. The apparatus according to claim 1, wherein the obtaining unit has a camera and a lighting unit.

11. The apparatus according to claim 5, wherein the information obtaining unit has a camera and a projector.

12. A method for controlling an apparatus, comprising:
obtaining an image of an object in a state where the object held by a holding unit is in front of an interface unit and is not inserted into the interface unit;
storing a first model of the object and a second model of the interface unit;
obtaining a relative position and orientation between the object and the interface unit based on the first model, the second model and the obtained image;
calculating a first position and orientation of the object and a second position and orientation of the object based on the obtained relative position and orientation of the object, wherein the first position and orientation corresponding to a condition that a portion of the object is obliquely inserted in the interface unit, the second position and orientation corresponding to a condition that the object has been inserted in the interface unit;

generating a movement path which is from a position and orientation of the object held by a holding unit in a state where the object is in front of an interface unit and is not inserted into the interface unit, to the second position and orientation through the first position and orientation of the object; and moving the holding unit along the generated movement path.

13. A non-transitory computer-readable storage medium storing a computer program for causing a computer to function as:

a first obtaining unit configured to obtain an image of an object in a state where the object held by a holding unit is in front of an interface unit and is not inserted into the interface unit;

a storing unit configured to store a first model of the object and a second model of the interface unit;

a second obtaining unit configured to obtain a relative position and orientation between the object and the interface unit based on the model, the second model and the obtained image;

a calculating unit configured to calculate a first position and orientation of the object, and a second position and orientation of the object based on the obtained relative position and orientation of the object, wherein the first position and orientation corresponding to a condition that a portion of the object is obliquely inserted in the interface unit, the second position and orientation corresponding to a condition that the object has been inserted in the interface unit;

a movement path generating unit configured to generate a movement path which is from a position and orientation of the object held by a holding unit in a state where the object is in front of an interface unit and is not inserted into the interface unit, to the second position and orientation through the first position and orientation of the object; and a controller configured to move the holding unit along the generated movement path.

* * * * *